United States Patent
Guderzo

(10) Patent No.: US 7,373,232 B2
(45) Date of Patent: May 13, 2008

(54) METHOD FOR CARRYING OUT A MULTIPLE GEAR-SHIFTING IN AN ELECTRONICALLY SERVO-ASSISTED BICYCLE GEARSHIFT AND RELATED GEARSHIFT

(75) Inventor: Gianfranco Guderzo, Arzignano (IT)

(73) Assignee: Campagnolo S.r.l., Vicenza (IT)

( * ) Notice: Subject to any disclaimer, the term of this patent is extended or adjusted under 35 U.S.C. 154(b) by 685 days.

(21) Appl. No.: 10/898,117

(22) Filed: Jul. 23, 2004

(65) Prior Publication Data

US 2005/0043129 A1   Feb. 24, 2005

(30) Foreign Application Priority Data

Jul. 24, 2003  (EP) .................................. 03425495

(51) Int. Cl.
  *G06F 7/00* (2006.01)
  *F16H 63/00* (2006.01)
  *F16H 59/00* (2006.01)

(52) U.S. Cl. .......................... 701/51; 701/36; 474/116; 474/78; 474/80; 74/502.2

(58) Field of Classification Search ............ 701/51–52, 701/57; 474/69–73, 116, 78, 80; 74/89.2, 74/89.21, 502.2; 340/432
See application file for complete search history.

(56) References Cited

U.S. PATENT DOCUMENTS 4,490,127 A * 12/1984 Matsumoto et al. ........ 474/110

| 5,261,858 | A |  | 11/1993 | Browning |
| 5,470,277 | A |  | 11/1995 | Romano |
| 5,480,356 | A |  | 1/1996 | Campagnolo |
| 5,865,454 | A |  | 2/1999 | Campagnolo |
| 6,047,230 | A |  | 4/2000 | Spencer et al. |
| 6,634,971 | B2 |  | 10/2003 | Campagnolo |
| 6,988,739 | B2 | * | 1/2006 | Guderzo et al. ............ 280/260 |
| 7,121,968 | B2 | * | 10/2006 | Campagnolo et al. ........ 474/80 |
| 7,159,881 | B2 | * | 1/2007 | Guderzo et al. ............ 280/260 |
| 7,184,872 | B2 | * | 2/2007 | Guderzo ...................... 701/51 |
| 7,223,189 | B2 | * | 5/2007 | Guderzo et al. ............. 474/70 |
| 2001/0042767 | A1 |  | 11/2001 | Campagnolo |
| 2001/0048211 | A1 |  | 12/2001 | Campagnolo |

FOREIGN PATENT DOCUMENTS

| DE | 39 38 454 A1 | 11/1989 |
| EP | 1 103 456 A2 | 5/2001 |
| EP | 1 238 903 A2 | 9/2002 |

OTHER PUBLICATIONS

Campagnolo ErgoBrain Operation Manual (English pages) No Date.

* cited by examiner

*Primary Examiner*—Yonel Beaulieu
(74) *Attorney, Agent, or Firm*—Volpe and Koenig P.C.

(57) ABSTRACT

An electronically servo-assisted gearshift actuates a multiple gear-shifting that moves a chain from a current toothed wheel to a target toothed wheel not immediately adjacent to the current toothed wheel in a gearshift group having at least three toothed wheels. Actuating the multiple gear-shifting takes several steps (i) actuating a single gear-shifting to move the chain to a toothed wheel immediately adjacent to the current toothed wheel in the gear-shifting direction, and (ii) repeating step (i) until the immediately adjacent toothed wheel is the target toothed wheel.

41 Claims, 11 Drawing Sheets

METHOD FOR CARRYING OUT A MULTIPLE GEAR-SHIFTING IN AN ELECTRONICALLY SERVO-ASSISTED BICYCLE GEARSHIFT AND RELATED GEARSHIFT

FIELD OF THE INVENTION

The field of the invention is electronic gearshifts for bicycles.

BACKGROUND

A bicycle gearshift comprises 1) a chain and toothed wheel system that transmits motion from the axle of the pedal cranks to a bicycle driving-wheel; and 2) means for selecting the toothed wheels with which the chain is engaged to change the motion transmission ratio.

A rear gearshift group is usually associated with the rear wheel hub of the bicycle. The group comprises at least two toothed wheels (also known as sprockets), a guide element for the chain (specifically, a rear derailleur or simply gearshift), and a control mechanism that displaces the guide element for the chain in the axial direction of the gearshift group so that the chain engages a predetermined toothed wheel in response to a manual manipulation of levers attached to the bicycle handlebars. A displacement from a toothed wheel with a smaller diameter to a toothed wheel with a larger diameter is indicated as "upward gear-shifting," whereas a displacement from a toothed wheel with a larger diameter to a toothed wheel with a smaller diameter is indicated as "downward gear-shifting." These terms are not the same and should not be confused with "up-shifting" and "down-shifting."

Similarly, a front gearshift group is usually associated with the axle of the pedal cranks of the bicycle, and comprises 1) at least two toothed wheels also known as crowns or gears; 2) a guide element for the chain also known as front derailleur or derailleur, and 3) an actuator to displace the guide element for the chain.

Either the front gearshift group or the rear gearshift group can be replaced by a single toothed wheel, although this is less common in the rear gearshift group.

The mechanical gearshift's command mechanism comprises a steel cable slidably extending in a sheath ("Bowden cable") between a manually actuated lever and the guide element for the chain. The actuation of the lever in a first direction exerts a traction on the guide element for the chain through the steel cable, whereas the actuation of the lever in a second, opposite direction exerts a thrust on the guide element for the chain through the steel cable, or rather it leaves the cable and the guide element for the chain free to be drawn by a return spring. The size of the displacement of the steel cable is set so that the stroke of the guide element for the chain is essentially equal to the distance or pitch between two adjacent toothed wheels of the gearshift group.

In an electronically servo-assisted gearshift, the command mechanism of the guide element for the chain comprises an actuator generally having an electric motor, and a lever system. An electronic control unit is also provided. The electronic control unit drives the actuators in order to carry out the gear-shiftings in a manual, automatic or semi-automatic mode. In the manually operated travel mode, the transmission ratio is input to the electronic control unit by the user through manual input means. In the automatically operated travel mode, the electronic control unit establishes the transmission ratio based upon an evaluation logic of the travel conditions. In the semi-automatically operated travel mode, the operation is a compromise between the manual and fully automatic.

The electronic control unit controls the actuators using logic positions ("logic values") representing the physical positions of the various toothed wheels. These logic values are stored in suitable memory means.

In the rear and/or front gearshift group there can also be a transducer to detect the position of the actuator (and therefore of the guide element for the chain) and transmit the position to the electronic control unit.

Electronically servo-assisted bicycle gearshifts of the aforementioned type are described, for example, in U.S. Pat. Nos. 5,480,356, 5,470,277 and 5,865,454, and in European Patent Application EP 1 103 456, all assigned to or in the name of Campagnolo S.r.l.; and in U.S. Pat. No. 6,047,230 to Spencer et al. and German Patent Application No. DE 39 38 454 A1 to Ellsässer.

EP 1 103 456 describes a gearshift in which absolute type position transducers provide an electric signal indicating the absolute position of the derailleurs, so that after being switched (back) on, such transducers take into account the actual position of the derailleurs. This position could have slightly moved when the transducer was switched off because of vibrations caused during transportation.

Sometimes a rider needs to make a multiple gear-shifting, that is, move the chain from the toothed wheel (of the rear or front gearshift group) with which it is engaged—or current toothed wheel—to a toothed wheel not immediately adjacent to it. If this multiple gear-shifting moves the chain to a toothed wheel with a larger diameter, the process is called multiple upward gear-shifting; if it moves the chain to a toothed wheel with a smaller diameter, it is called multiple downward gear-shifting. Multiple gear-shifting using a mechanical command gearshift requires a single actuation of the lever (often for a longer time than for a single gear-shifting), or many actuations in quick succession. In either case, the actuation(s) impose(s) a displacement of the Bowden cable that moves the guide element for the chain equal to twice or three times the pitch between two adjacent toothed wheels (and thus moves the chain). In practice, displacing the chain guide element over greater than two or three times the pitch between two adjacent toothed wheels is difficult. Thus, the multiple gear-shifting is limited to a double or triple gear-shifting.

A solution that might be suitable for electronically commanded gearshifts is using an electronic control unit that, to carry out multiple gear-shifting, drives the actuator in a single step based upon the logic position representing the physical position of the target toothed wheel.

FIGS. 3 and 4 show the prior art for this. FIG. 3 shows a perspective view of the prior art where the main elements of the motion transmission system are shown. These are the toothed wheels of the rear gearshift group, indicated by reference numerals 11a-11i, the rear guide element or gearshift 14, the toothed wheels of the front gearshift group, of which only the outermost toothed wheel with the largest diameter is visible, the front guide element or derailleur 15, and the chain 13. The position of the gearshift 14 and of the chain 13 at the moment of a multiple gear-shifting from the toothed wheel 11c to the toothed wheel 11f is illustrated (i.e. a triple upwards gear-shifting, in this example), as carried out according to the prior art.

FIG. 4 schematically illustrates a view from the back side of the bicycle 1. Therefore, only the toothed wheels 11a-11i of the rear gearshift group 9, the rear guide element or gearshift 14 and the chain 13 can be seen. More specifically, the initial positions (to the right) and the end positions (to the left) of the gearshift 14 and of the chain 13, as well as the intermediate position of the chain 13 at the moment of a multiple gear-shifting from the toothed wheel 11c to the toothed wheel 11f carried out according to the prior art are illustrated.

The chain 13, drawn to move in the way X of the direction of axis A, is arranged at a large angle ALFA (formed between the plane of extension of the chain 13 and the planes of the toothed wheels 11), and is askew with respect to the intermediate toothed wheels 11d, 11e. This severe angle can cause the chain 13 to lose traction and/or get caught in the intermediate toothed wheels 11d, 11e, with the result that the rider can lose balance and fall. Moreover, the gearshift can be subject to mechanical damage. These problems are exacerbated during upward multiple gear-shifting.

SUMMARY

The problem outlined above can be solved using the electronically servo-assisted gearshift described herein. The gearshift executes the step of actuating a multiple gear-shifting that moves a chain from a current toothed wheel to a target toothed wheel not immediately adjacent to the current toothed wheel in a gearshift group having at least three toothed wheels. Actuating the multiple gear-shifting comprises the steps of (i) actuating a single gear-shifting to move the chain to a toothed wheel immediately adjacent to the current toothed wheel in the gear-shifting direction, and (ii) repeating step (i) until said immediately adjacent toothed wheel is the target toothed wheel.

BRIEF DESCRIPTION OF THE DRAWINGS

Further characteristics and advantages of the present invention shall become clearer from the following detailed description of some of its preferred embodiments, given with reference to the attached drawings. In the drawings.

DETAILED DESCRIPTION OF THE PREFERRED EMBODIMENTS

Figure 1:
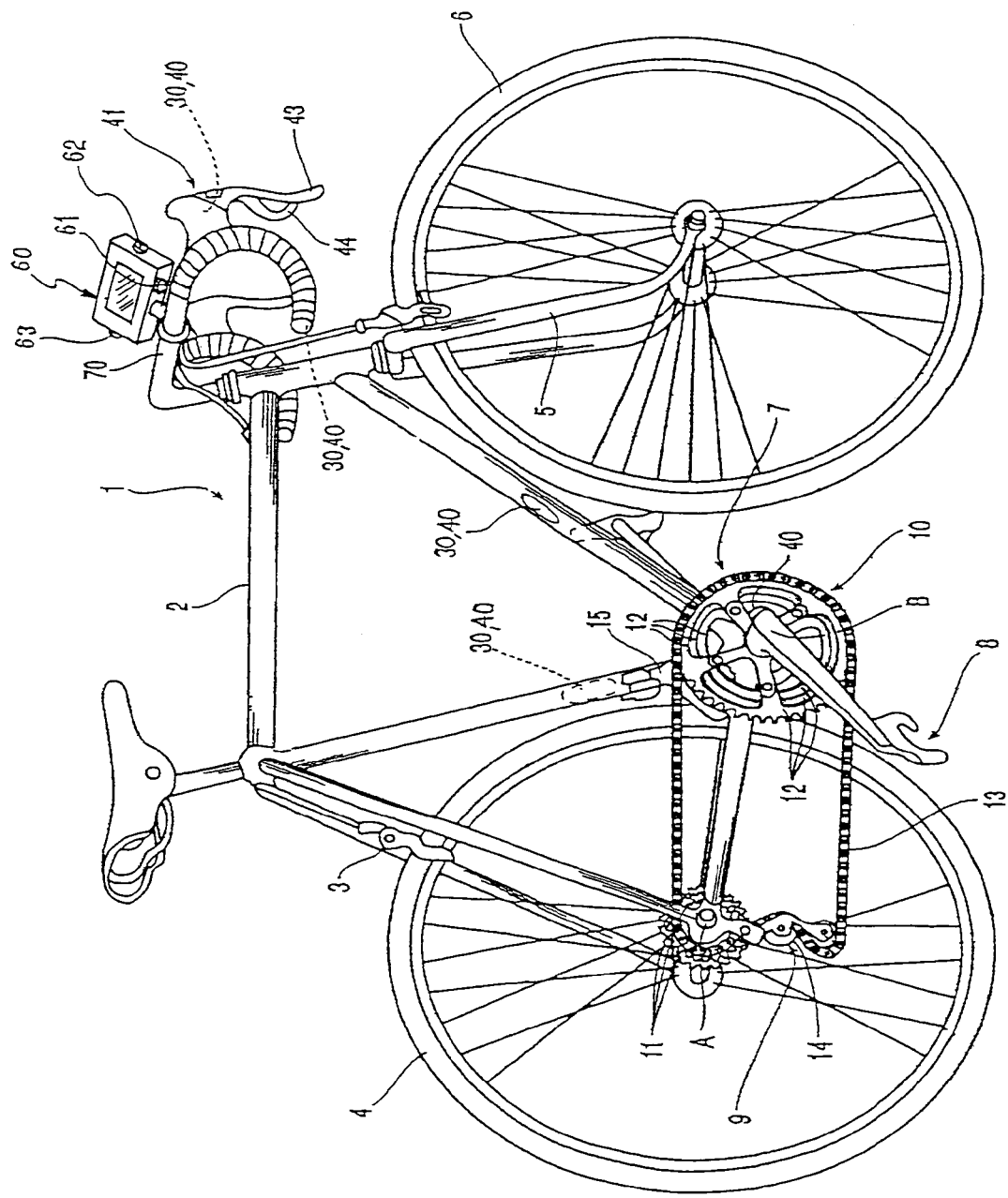
FIG. 1 is a perspective view of a bicycle equipped with an electronically servo-assisted gearshift.

With reference to FIG. 1, a bicycle 1, in particular a racing bicycle, includes a frame 2 formed in a known way by tubular elements defining a support structure 3 for a rear wheel 4 and a fork 5 for a front wheel 6. Tubular handlebars 70 are connected to the fork 5.

The frame 2, at its lower portion, bears an axle of the pedal cranks or pedal unit 7, that drives the rear wheel 4 through an electronically servo-assisted gearshift 8 described herein. The gearshift 8 has a rear gearshift group 9 and a front gearshift group 10. The rear gearshift group 9 includes a plurality of toothed wheels or sprockets 11 (typically nine, ten, eleven or other in number) having different diameters and coaxial (axis A) with the rear wheel 4. The front gearshift group 10 includes a plurality of toothed wheels or crowns or gears 12 (three in number in the illustrated example, but which can also be two or other in number), having different diameters and coaxial (axis B) with the axle of the pedal cranks 7.

Although it is not advantageous in terms of number of transmission ratios, the front gearshift group (or in principle also the rear gearshift group) can be replaced by a single toothed wheel, and in such a case, the gearshift described herein would not apply to this front (or rear) gearshift group. In the case in which one of the two gearshift groups (typically the front gearshift group) comprises just two toothed wheels, the invention is applicable to the gearshift group comprising more than two toothed wheels (typically the rear gearshift group).

The toothed wheels 11 of the rear gearshift group 9 and the toothed wheels 12 of the front gearshift group 10 are selectively engaged by a closed loop transmission chain 13 that transfers power from the axis of the pedal cranks 7 to the driving rear wheel 4. Different transmission ratios are obtained by moving a rear chain guide element or rear derailleur (gearshift) 14 of the rear gearshift group 9 and/or a front chain guide element or front derailleur 15 of the front gearshift group 10.

A respective actuator 16, 17 (shown only schematically in FIG. 2) typically comprising an articulated parallelogram mechanism and an electric motor with a reducer to deform the articulated parallelogram controls the rear and front derailleur 14, 15.

The actuators 16, 17 respectively are associated with a position sensor for the rear derailleur 14 (directly or through detection of the position of the rear actuator) or rear transducer 18 (shown only schematically in FIG. 2) and a position sensor for the front derailleur 15 (directly or through detection of the position of the front actuator) or front transducer 19. The details of the construction of the rear and front derailleurs 14, 15, of the respective actuators 16, 17 and of the respective position sensors or transducers 18, 19 are not illustrated herein. The description of the patent applications and patents cited above give more details for this. In particular, the transducers 18, 19 are preferably of the type described in EP 1 103 456 A2 to applicant Campagnolo S.r.l. suitable to provide an electric signal indicating the absolute position of the rear and front derailleurs 14, 15.

The electronically servo-assisted gearshift comprises a microprocessor electronic control unit 40 for driving the actuators 16, 17, receiving the output signals of the transducers 18, 19 if provided, and controlling a user interface.

The term electronic control unit 40 means a logic unit that may be formed by several physical units, in particular one or more distributed microprocessor(s) contained in a display unit 60 and/or in an electronic power board 30 and/or in a command unit. The electronic control unit 40 comprises, besides the microprocessor(s), memory means that comprise one or more storing devices for storing the instructions that codify the management program of the electronic gearshift, for the temporary storing of service variables for carrying out the program itself (registers), as well as for volatile, non-volatile or permanent storing of one or more delay value(s). The storing devices can be of one or more types among read only, write once, or read/write, random access or sequential access memories, and can be made in various technologies, such as optical memories, magnetic memories, etc. The storing device(s) can be located in the display unit 60 and/or in the electronic power board 30 and/or in the command unit and/or be separate devices. An example of such a display unit is the Ergobrain (TM) sold by Campagnolo S.r.l.

In a preferred embodiment, the display unit 60 can be removed from the bicycle 1 and houses at least part of the memory means of the electronic control unit 40. In such a case, the values set by the user for various parameters of the electronically servo-assisted gearshift 8, in particular the value of one or more delay(s), are preferably stored in the memory means housed in the display unit 60. When the display unit 60 is reconnected to the bicycle 1, the values of the variables stored therein may be copied in a temporary memory of the electronic control unit 40. This embodiment is particularly advantageous for racing bicycles, where the values set by the rider reflect his expertise and are therefore private, and also because it protects the display unit from theft.

The battery-powered electronic power board 30 supplies electrical power to the actuators' 16, 17 motors and to the microprocessor(s) electronic control unit 40, as well as to the transducers 18, 19 and to the display unit 60 if provided. The battery is preferably rechargeable and the rear derailleur 14 can include a dynamo electric unit (not shown) to recharge the battery.

The electronic power board 30 is preferably housed in one of the tubes of the handlebars 70, in one of the tubes of the frame 2, for example at a support for a bottle (not illustrated, but shown for example, in U.S. patent application Ser. No. 09/850069, published as US2001/0042767), or in the display unit 60, which is preferably housed centrally on the handlebars 70.

The transfer of information between the various components is carried out through electric cables, advantageously housed inside the tubes of the frame 2, or else with wireless methods, for example with Bluetooth protocol.

The electronically servo-assisted gearshift 8, and in particular the electronic control unit 40, can operate in several different modes. In a manual operation travel mode, the desired transmission ratio for each gearshift group 9, 10, in other words the toothed wheel 11 or 12 with which the chain 13 must engage, is manually entered on the electronic control unit through a suitable interface. In an automatic operation travel mode, the electronic control unit 40 itself establishes the transmission ratio based upon an evaluation logic of the travel conditions (for example through speed sensors, inclinometers, pressure sensors or sensors of the heartbeat of the rider etc.). A semi-automatic operation travel mode combines these two modes. Other modes include service modes such as a programming mode, a diagnostics mode, etc.

Regardless of the travel mode, the gearshift requests between the current toothed wheel 11, 12 (the toothed wheel 11, 12 with which the chain 13 is engaged at the moment of the gear-shifting request) and a target toothed wheel are managed by the electronic control unit 40. The gear-shifting requests can be single gear-shifting requests, when the target toothed wheel is immediately adjacent to the current toothed wheel 11, 12 (the toothed wheel 11, 12 with which the chain 13 is engaged at the moment of the gear-shifting request), or else multiple gear-shifting requests, when the target toothed wheel is not immediately adjacent to the current wheel.

During single gear-shifting, the electronic control unit 40 drives the actuator 16, 17 in order to move the guide element 14, 15 for the chain 13 to engage it with the target toothed wheel 11, 12.

The control of the actuator 16, 17 relies on at least two sets of data: logic positions ("logic values") representing the physical positions of the various toothed wheels 11, 12 that are stored in suitable memory means 49, 50, and also a logic value representing the position of the actuator 16, 17. The logic value representing the position of the actuator 16, 17 is provided by a counter 47, 48 (embodied by a register or by a variable stored in a memory cell of the electronic control unit 40) updated by the electronic control unit 40 while it drives the actuator 16, 17. For example, when the motor is a stepper motor, the counter 47, 48 increases or decreases by one unit for every step imposed on the motor of the actuator 16, 17. Alternatively, the logic value representing the position of the actuator 16, 17 is provided by the transducer 18, 19. As a further alternative, the logic value representing the position of the actuator 16, 17 is provided by the counter 47, 48 while the output of the transducer 18, 19 is used by the electronic control unit 40 as a confirmation or feedback signal.

For each gearshift group 9, 10, in the memory means 49, 50, the logic positions of all the toothed wheels 11, 12 can be stored, or else one or more differential values corresponding to the pitch(es) between two adjacent toothed wheels 11, 12 can be stored, possibly together with the position of a toothed wheel 11, 12 taken as a reference.

During multiple gear-shifting, in a conventional electronically commanded gearshift, the electronic control unit would drive the actuator 16, 17 in a single step based upon the logic position representing the physical position of the target toothed wheel. In the gearshift and method described herein, a multiple gear-shifting request is divided into a plurality of single gear-shiftings between two adjacent toothed wheels 11, 12.

Figure 4:
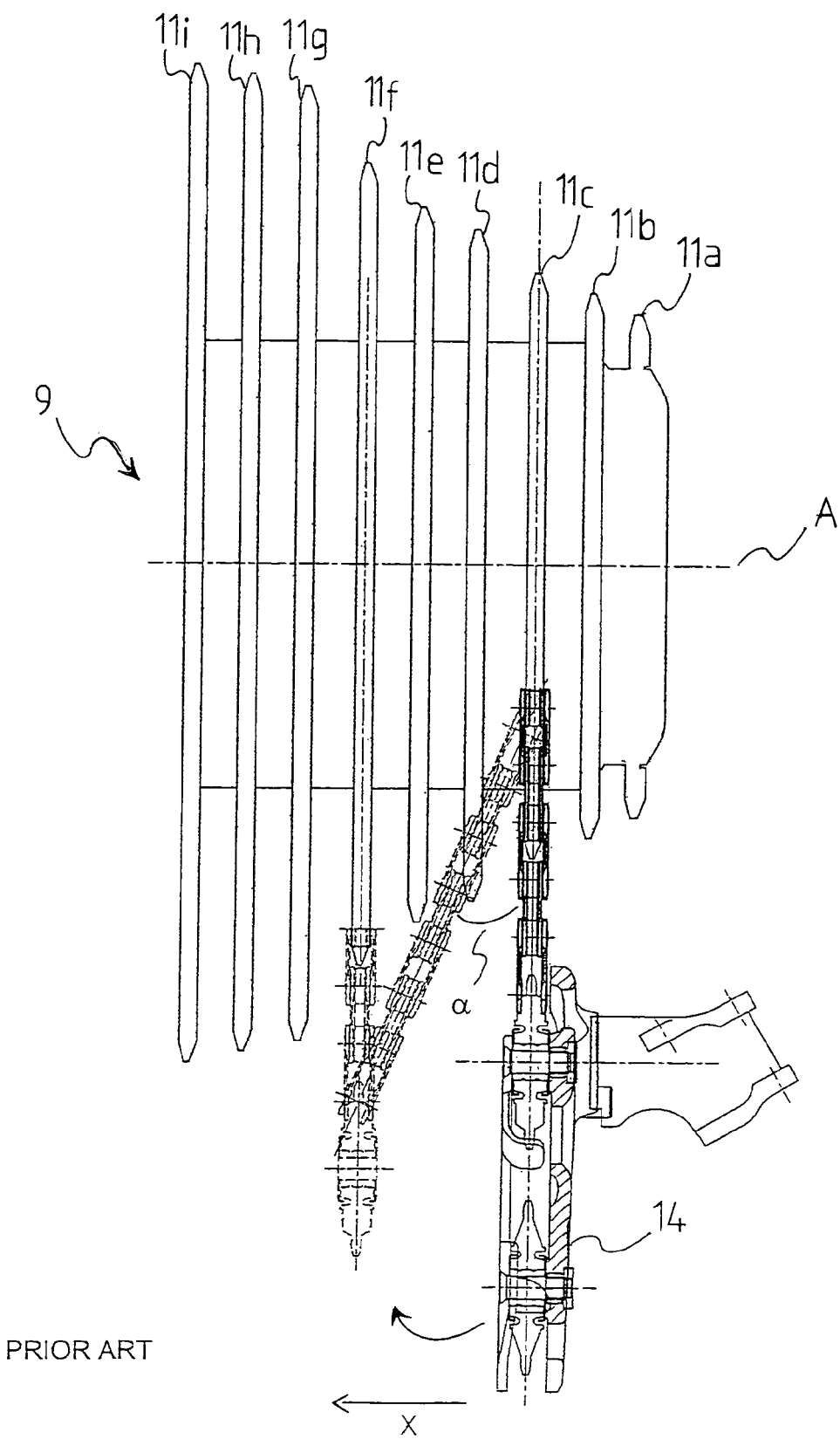
Figure 5:
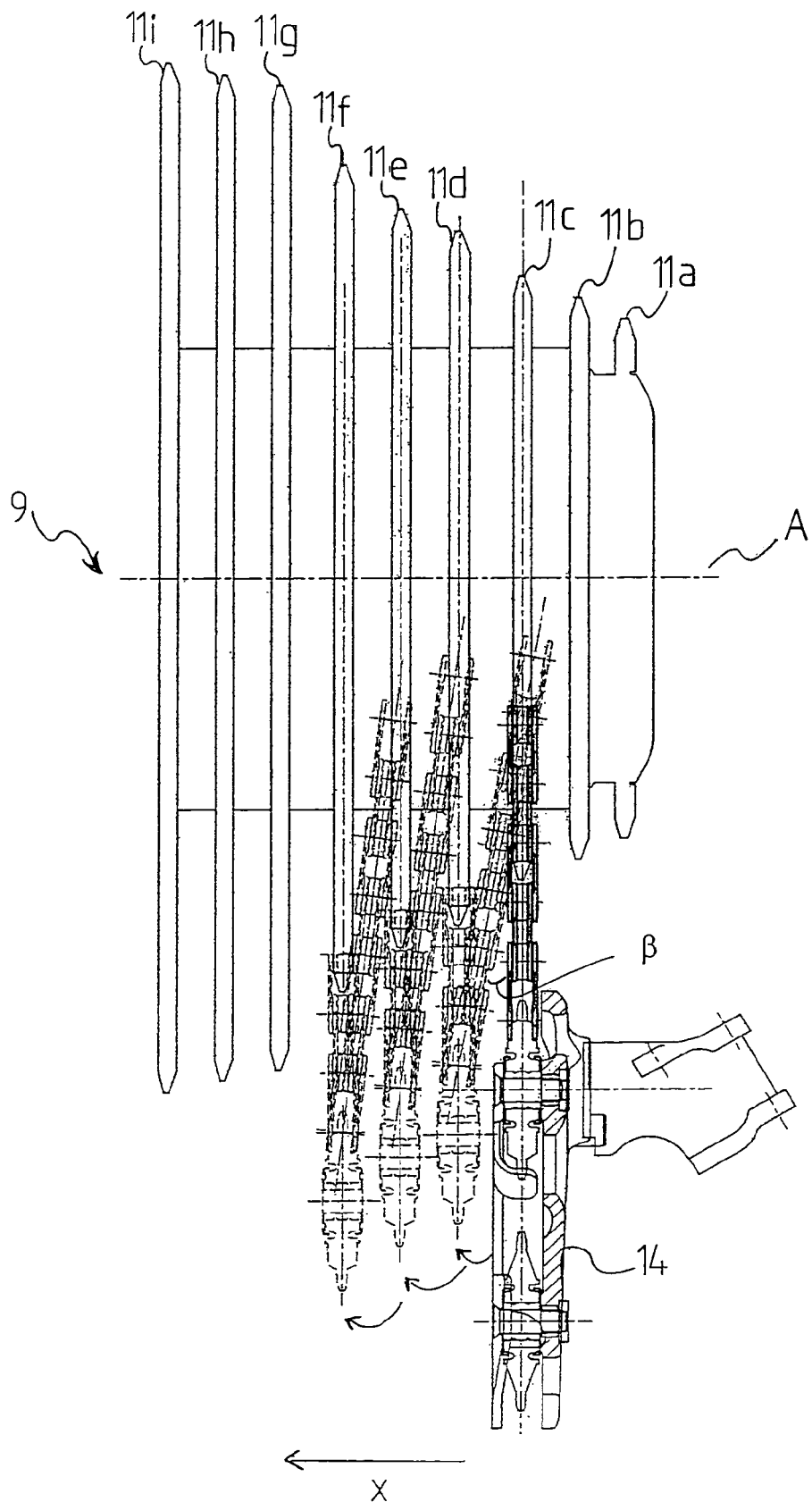
FIG. 5 shows the position of the motion transmission system for multiple gear-shifting.

As an example and compared to FIG. 4, FIG. 5 illustrates the management of a multiple gear-shifting request from the current toothed wheel 11c to the target toothed wheel 11f (i.e. a triple upwards gear-shifting). FIG. 5 shows the guide element or gearshift 14 and the chain 13, from right to left, (1) in the position existing before the gear-shifting request, in which the current toothed wheel is toothed wheel 11c, (2) in the position existing after the first single gear-shifting, in which the current toothed wheel is toothed wheel 11d, (3) in the position existing after the second single gear-shifting, in which the current toothed wheel is toothed wheel 11e, and (4) in the end position, in which the current toothed wheel is the target toothed wheel 11f.

It can be seen that the angle BETA formed between the plane of extension of the chain 13 and the planes of the toothed wheels 11d, 11e, 11f is small compared to the angle ALFA illustrated in FIG. 4. As a consequence of such a reduction, the gearshift overcomes the drawbacks the prior art discussed above.

Figure 6:
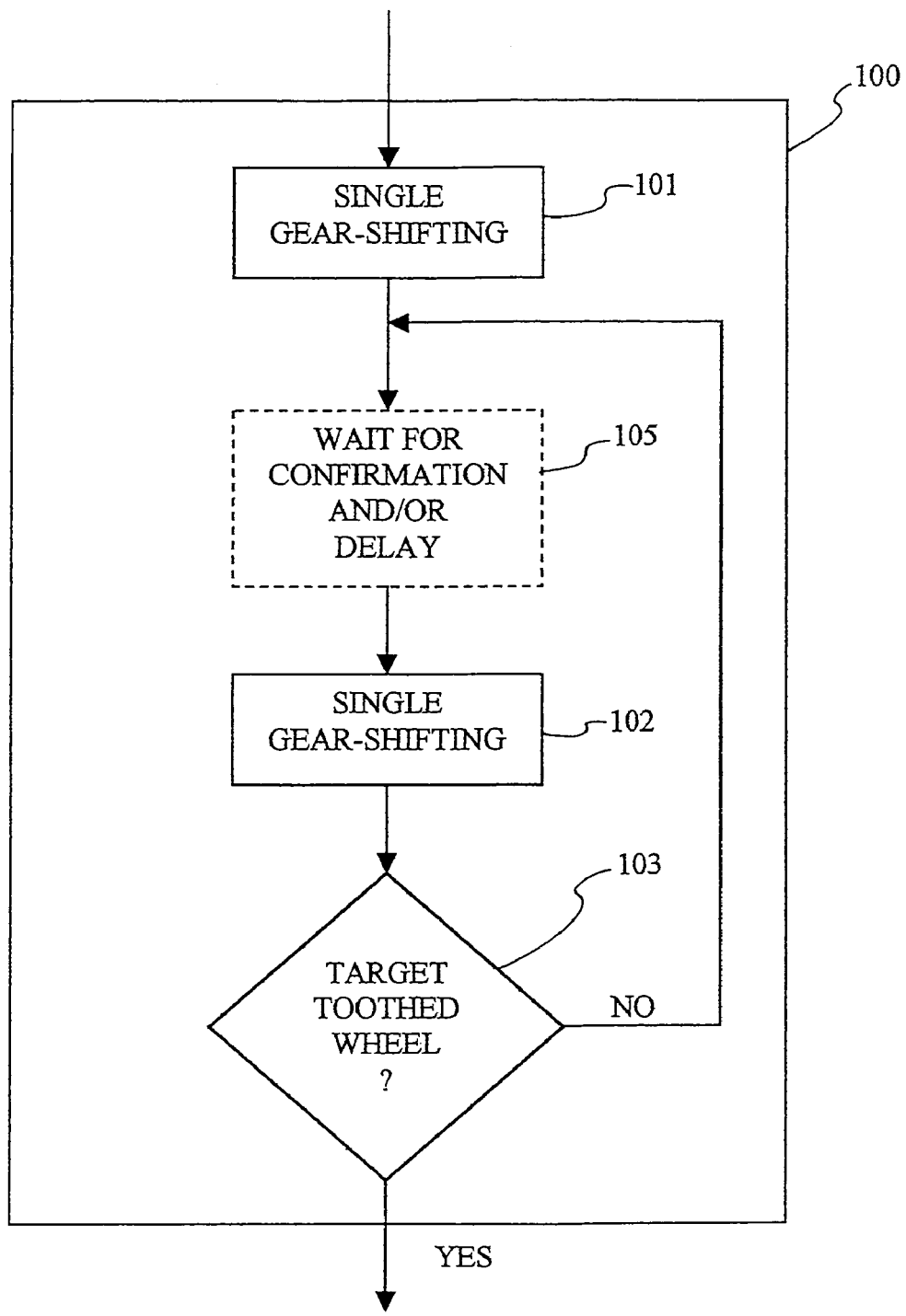
FIG. 6 is a block diagram showing the actuation of multiple gear-shifting.

FIG. 6 shows the steps of carrying out a multiple gear-shifting 100 to move the chain 13 in a gear-shifting direction (X) with respect to a gearshift group 9, 10 having at least three toothed wheels, from a current toothed wheel 11c to a non-adjacent target toothed wheel 11f. The steps comprise:

actuating a single gear-shifting 101 to move the chain 13 to a toothed wheel (11d, then 11e, then 11f) immediately adjacent to the current toothed wheel (11c, then 11i, then 11e) in the gear-shifting direction (X), and repeating 102 the previous step a certain number of times (three in the illustrated example), until said immediately adjacent toothed wheel (11d, then 11e, then 11f) is the target toothed wheel (11f), as evaluated in block 103.

Each single gear-shifting 101, 102 is carried out with the procedures outlined above, in other words, driving the actuator 16, 17 to move the guide element for the chain 14, 15 to bring the chain 13 in a position such as to engage with the toothed wheel 11, 12 respectively immediately adjacent to the toothed wheel 11, 12 respectively current, with reference to the logic positions and to the logic value representing the position of the actuator 16, 17.

Between one single gear-shifting and the other, the electronic control unit 40 can wait for a confirmation of successful gear-shifting, for example the confirmation by the transducer 18, 19 (optional block 105).

Figure 7:
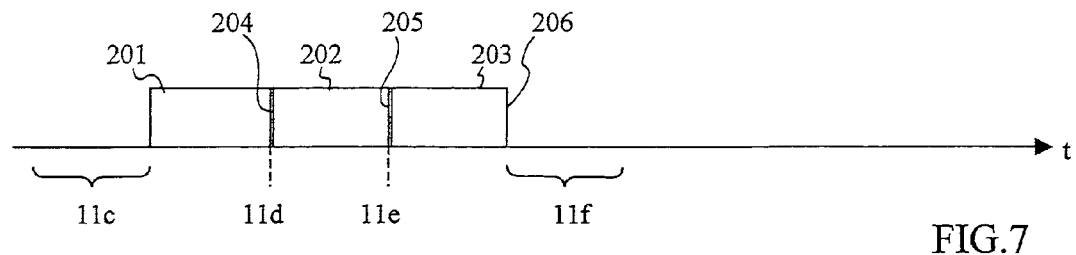
FIGS. 7-10 are charts that show the actuation of a multiple gear-shifting according to various embodiments over time.

FIG. 7, which is not to scale, shows the time axis t, signals 201-203 that correspond to the time ranges in which the actuator 16(17) is driven by the electronic control unit 40 (actuation of the single gear-shiftings 101, 102, 102), and the toothed wheels 11c, 11d, 11e, 11f with which the chain 13 engages. The rising edges of the signals 201-203 correspond to the start of the single gear-shifting steps, and the falling edges 204-206 correspond to the confirmations of successful gear-shifting.

Quick sequence of successive positionings of the chain 13, at the toothed wheels 11d, 11e, 11f, can, in some circumstances, be harmful to the mechanics of the gearshift 8 and frustrating or dangerous for the rider. To avoid this, a delay D (optional block 105) can be provided between each single gear-shifting actuation step 101, 102. The delay D allows the chain to remain effectively engaged on each intermediate toothed wheel 11d,11e long enough to settle in its new plane of extension, thus minimizing the mechanical stresses on the chain 13 and on the teeth of the toothed wheels 11d,11e. The delay also minimizes the danger of jamming the chain in the intermediate toothed wheels 11d, 11e.

The delay between the successful actuation of every single gear-shifting 101, 102 and the start of a subsequent single gear-shifting 102 preferably has a value within the range between 100 milliseconds and 350 milliseconds, more preferably between 120 milliseconds and 250 milliseconds, even more preferably between 140 milliseconds and 220 milliseconds.

Figure 8:
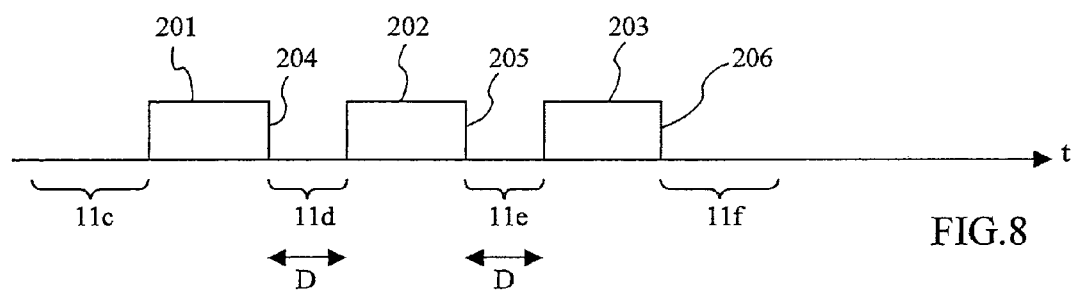
Figure 9:
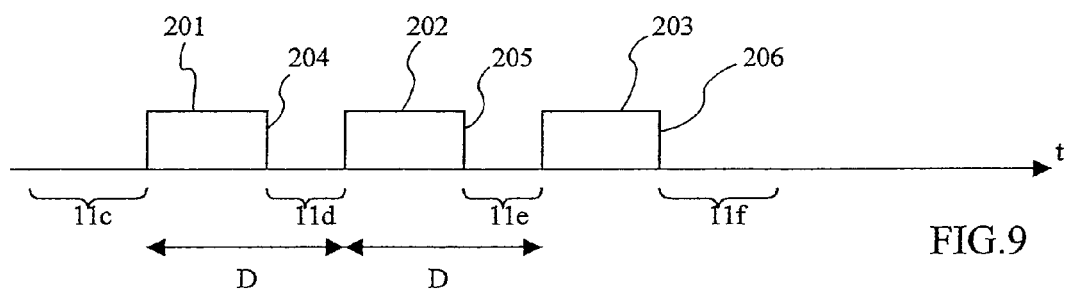

When in block 105 both the wait for the confirmation signal and the wait for the delay D are actuated, the delay D can be counted from the receipt of the confirmation signal (FIG. 8) or from the start of the step of actuating the previous single gear-shifting 101, 102 (FIG. 9). In this second case, it will have a greater value to take into account the time foreseen for the actuation of the single gear-shifting 101, 102, typically about 150-300 milliseconds, according to the rider, to the gear-shifting and to the travel conditions, if going uphill, going along the flat or going downhill etc.

Figure 10:
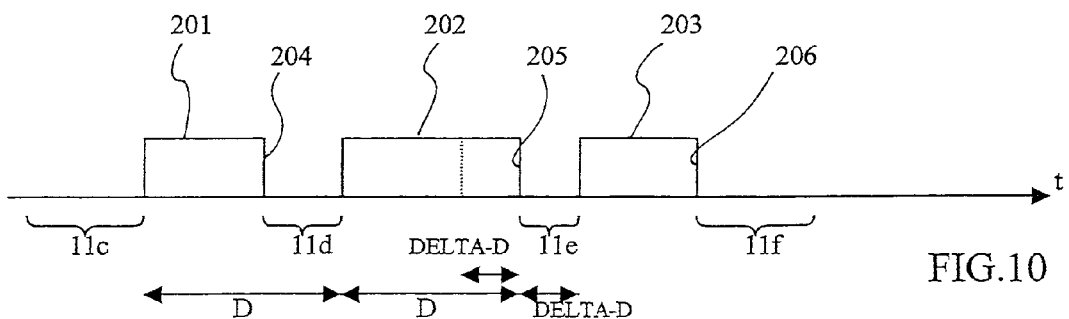

Moreover, in this second case, the value of the delay D can be set based upon the difference DELTA-D between the foreseen instant (falling edge of the single gear-shifting 202 shown with a broken line) of successful actuation of the single gear-shifting and the receipt of the confirmation of successful gear-shifting (FIG. 10), in other words increased or decreased if the confirmation signal is received before or after the foreseen instant.

Although up to now reference has been made to a single delay D between the upwards and downwards single gear-shiftings of the front gearshift group 9 and of the rear gearshift group 10, different delays are possible.

In a first embodiment a single predetermined delay D is used for each single intermediate gear-shifting of a multiple gear-shifting.

In a second embodiment, a delay UD for each upward gear-shifting and/or a delay DD for each downward gear-shifting is provided.

Since the tension of the chain 13 is different at the guide elements 14, 15 of the rear and front gearshift groups 9, 10, and since the pitch between adjacent toothed wheels 11 of the rear gearshift group 9 can be different from the pitch between adjacent toothed wheels 12 of the front gearshift group 10, and since the distance between the guide element 14, 15 for the chain 13 and the toothed wheels 11, 12 is different in the case of the two gearshift groups, front 9 and rear 10, it may be suitable to provide or not, in an independent manner, and thus with different values, the delay to be applied to the rear gearshift group 9 and to the front gearshift group 10.

Thus, in a third embodiment, the memory means are suitable to store a single delay RD for the rear gearshift group 9 and/or a single delay FD for the front gearshift group 10.

In a fourth embodiment, the memory means are suitable to store, for the rear gearshift group 9, an upward gear-shifting delay RUD and/or a downward gear-shifting delay RDD and/or, for the front gearshift group 10, an upward gear-shifting delay FUD and/or a downward gear-shifting delay FDD.

According to a fifth embodiment, which takes into account different diameters of the intermediate toothed wheels, the memory means are suitable to store independently up to a delay RiD for each intermediate toothed wheel of the rear gearshift group 9 and a delay FiD for each intermediate toothed wheel of the front gearshift group 10.

According to a sixth embodiment, the memory means are suitable to store independently up to an upward gear-shifting delay RiUD,FiUD and a downward gear-shifting delay RiDD,FiDD for each intermediate toothed wheel 11, 12 of each gearshift group 9, 10.

In the various aforementioned embodiments, the value of the or each delay is preset in the factory to default values. Preferably a setting operating mode of the electronic control unit 40 is provided, in which the value of the or each delay can be changed by the user. Before describing an example of a flow diagram of such a setting operating mode, it is worth emphasizing that in such a case it is suitable to foresee the possibility of going back to the default values (corresponding to nominal or average values), suitably stored in read only memory means. Moreover, an embodiment in which the delays are set by the user based upon a respective differential amount applied to the default value is also possible.

Figure 11:
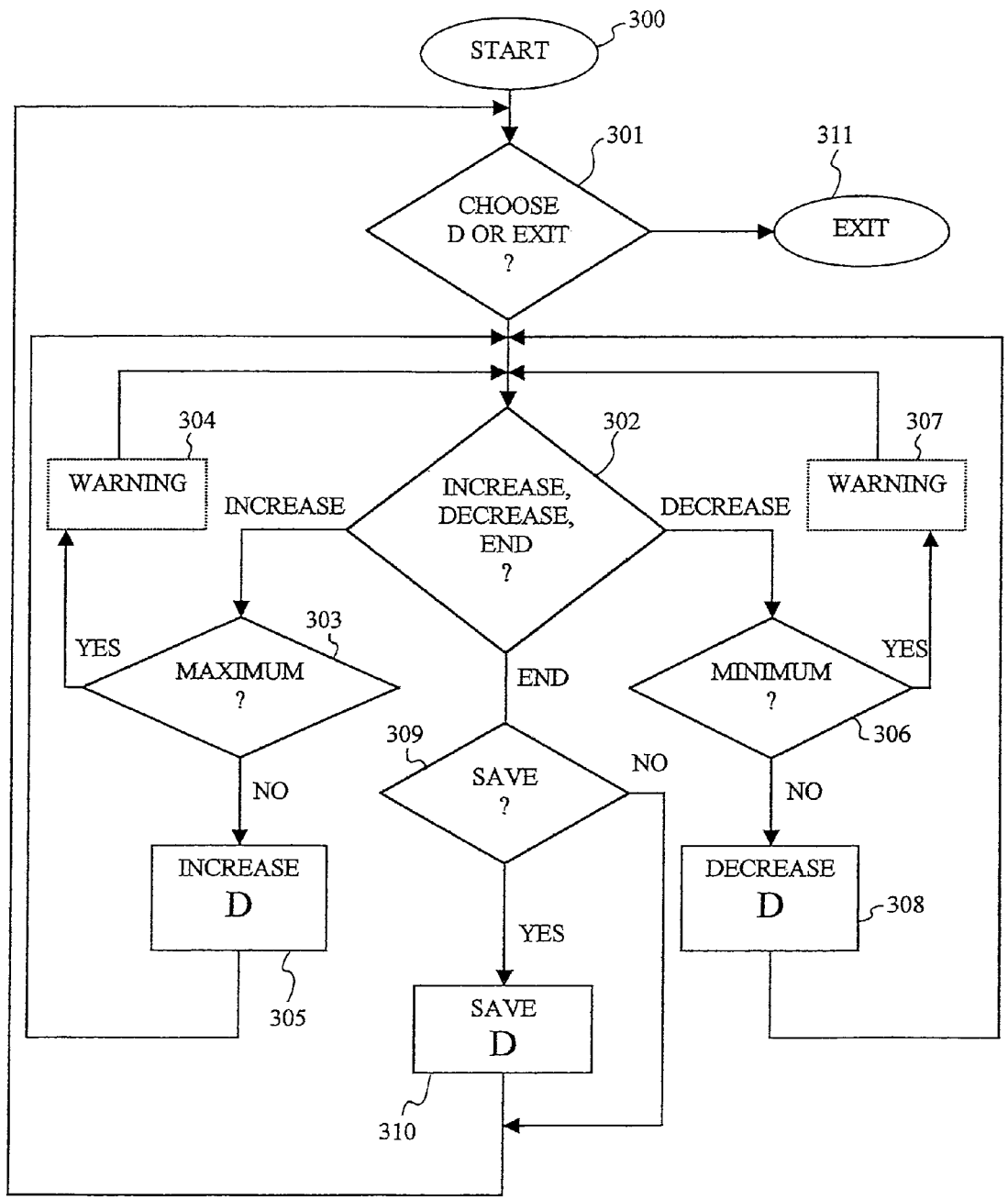
FIG. 11 is a block diagram of a way of setting a delay of the multiple gear-shifting.

FIG. 11 illustrates an example of a flow diagram of the programming operating mode. Starting from an initial block 300, in a block 301, the electronic control unit 40 checks whether one wishes to activate the setting mode and, in the affirmative case, with respect to which delay, for example (in the aforementioned embodiment) to the upwards gear-shifting delay RUD of the rear gearshift group 9, to the downwards gear-shifting delay RDD of the rear gearshift group 9, to the upwards gear-shifting delay FUD of the front gearshift group 10 or to the downwards gear-shifting delay FDD of the front gearshift group 10, or whether one wishes to leave the setting mode in a block 311.

After block 301, the electronic control unit 40 checks in a block 302 whether a user wishes to increase or decrease the preselected delay, or else to end the setting out related to the preselected delay.

If the electronic control unit 40 establishes that one wishes to increase the preselected delay (left side output from block 302), in a block 303 the electronic control unit 40 checks whether the preselected delay has a maximum value (general or specific for the preselected delay) and, in the affirmative case, goes back to block 302, possibly generating a warning to the user in an optional block 304.

If in the block 303, the electronic control unit 40 verifies that the preselected delay does not have the maximum value, then in a block 305 it increases the value of the preselected delay by a unit of time, and then it goes back to block 302.

In the same way, if at block 302 the electronic control unit 40 establishes that one wishes to decrease the preselected delay (right side output), then in a block 306 the electronic control unit 40 checks whether the preselected delay has a minimum value (general or specific for the preselected delay) and, in the affirmative case, goes back to block 302, possibly generating a warning to the user in an optional block 307.

If in the block 306 the electronic control unit 40 verifies that the preselected delay does not have the minimum value, then in a block 308 it decreases the value of the preselected delay by a unit of time, and then it goes back to block 302.

If in block 302 the electronic control unit establishes that a person wishes to end the setting out related to the preselected delay (lower output), the execution passes to a block 309 in which the electronic control unit 40 checks whether the person wishes to save the changes carried out.

In the affirmative case, the electronic control unit 40, in a block 310, saves the value of the preselected delay and goes back to block 301, in the negative case it goes back directly to block 301.

Figure 2:
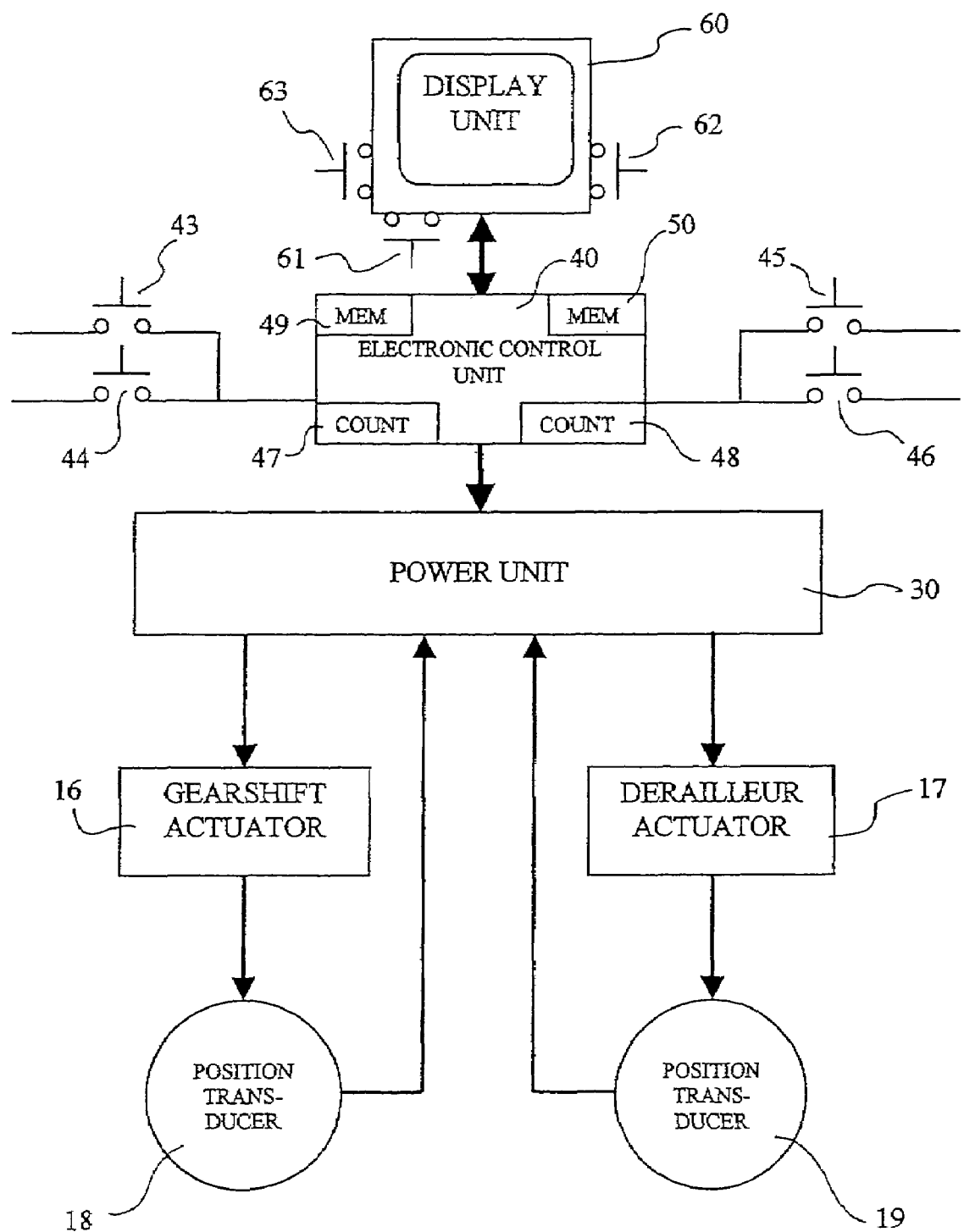
FIG. 2 is a block diagram of the electronically servo-assisted gearshift.
Figure 3:
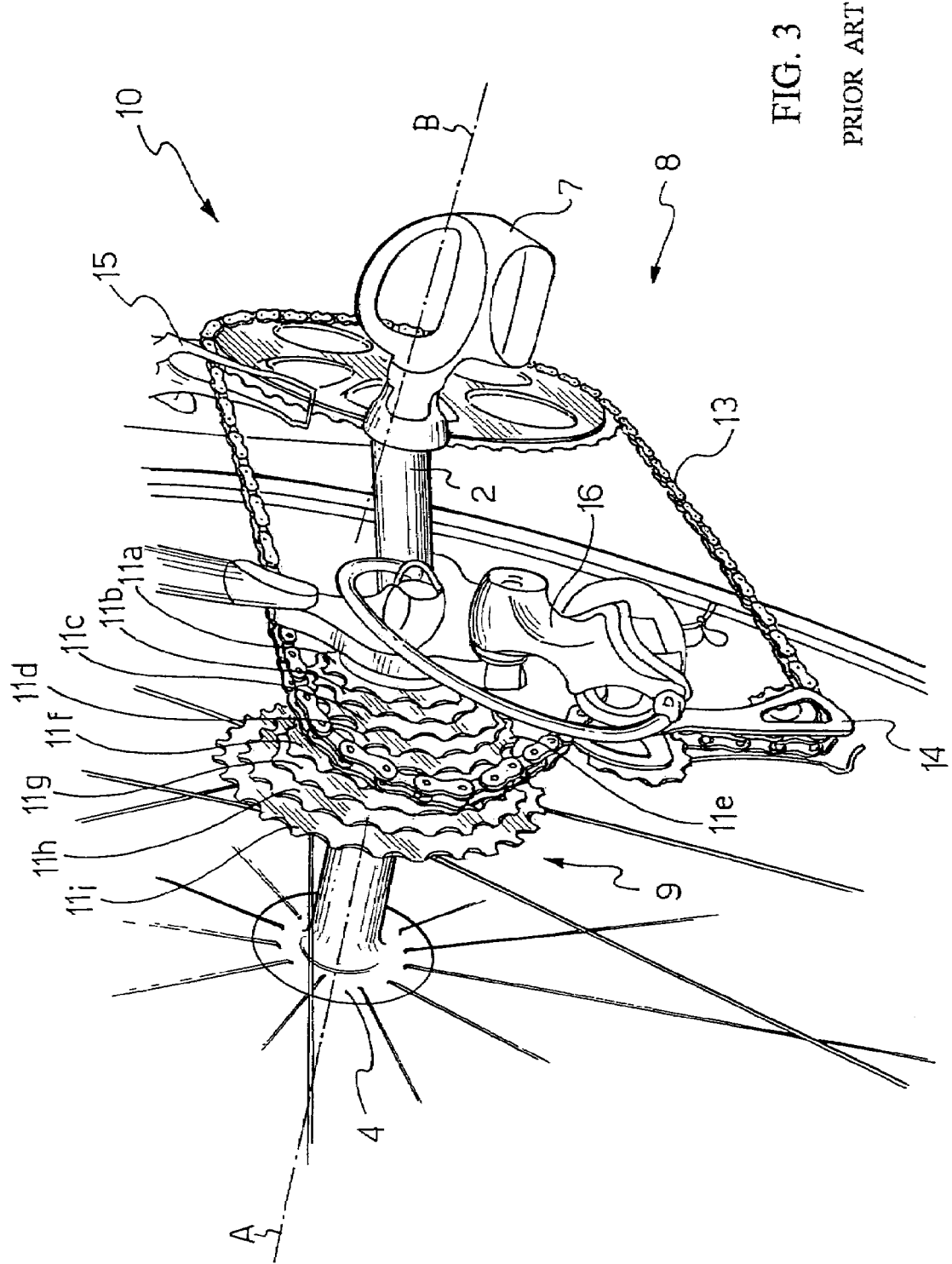
FIGS. 3 and 4 show the position of the motion transmission system in a multiple gear-shifting according to the prior art.

The various checks of what the user wishes to do can take place on the user interface, for example a graphical interface implemented on the display unit 60, through a touch-sensitive display or through auxiliary buttons as exemplified by the buttons 61-63 of FIG. 2 and/or on the basis of the same manual command means that are used to send the upward and downward gear-shifting request commands. The electronic control unit 40 suitably interprets the signal generated by the activation of such manual command means in a context-sensitive manner, for example through logic gates or Boolean functions.

Such manual command means can for example comprise levers 43, 44 (FIGS. 1 and 2) associated with the brake lever 41 on a grip of the handlebars 70 for the upwards and downwards single gear-shifting signals, respectively, of the rear gearshift group 9, and levers 45, 46 (FIG. 2) associated with the brake lever on the other grip of the handlebars 70 for the upwards or downwards single gear-shifting signals of the front gearshift group 10.

As an alternative to the levers 43-46, two manually actuated buttons, or two buttons actuated by a swing lever can be provided.

The levers or buttons suitable to provide the single gear-shifting requests can also be used to provide the multiple gear-shifting requests, where the type of gear-shifting request can be distinguished for example by the actuation time, by the number of consecutive actuations, by the fact that with a first actuation a start of gear-shifting request is generated and with a second actuation an end of gear-shifting request is generated, etc.

Alternatively, the manual command means can comprise other buttons or levers suitably intended for the multiple gear-shifting requests (not shown), as well as a numerical keypad or a graphical interface implemented on the display unit 60, with which the rider directly indicates the target toothed wheel.

According to the type of implementation, the electronic control unit 40 can establish a priori whether the gear-shifting request coming from the rider is multiple or single, or else cannot. In the same way, in normal travel mode with automatic or semi-automatic operation, the electronic control unit 40 can directly generate internal single gear-shifting requests or internal multiple gear-shifting requests, or else can generate an internal generic gear-shifting request, establishing afterwards whether the request is for a single or a multiple gear-shifting.

When the electronic control unit 40 is able to establish a priori whether the gear-shifting request coming from the rider is multiple or single, the method according to the invention comprises (FIG. 12) the steps of waiting in a block 400 for the receipt of a gear-shifting request, establishing in a block 401 whether the gear-shifting request is a single or a multiple gear-shifting request, if it is a single gear-shifting request, actuating, in a block 402, a single gear-shifting in the way outlined above, if it is a multiple gear-shifting request, actuating, in a block 100, a multiple gear-shifting as outlined above.

As stated, in manually commanded normal travel mode, the step 401 of establishing whether the gear-shifting request is a single gear-shifting request or a multiple gear-shifting request can be carried out, for example, based upon the duration of a signal received by the user interface, for example the duration of the pressing of one of the levers 43-46, based upon the number of consecutive signals received by a user interface, for example the number of consecutive presses of one of the levers 43-46, or based upon the particular signal indicating the desired target toothed wheel of the gear-shifting, transmitted by the graphical interface or by the numerical keypad.

Establishing whether the gear-shifting request is single or multiple generally requires a certain amount of time. It is thus advantageous to immediately actuate the first single gear-shifting between the current toothed wheel and the immediately adjacent toothed wheel, a single gear-shifting which is, in any case, requested.

Figure 13:
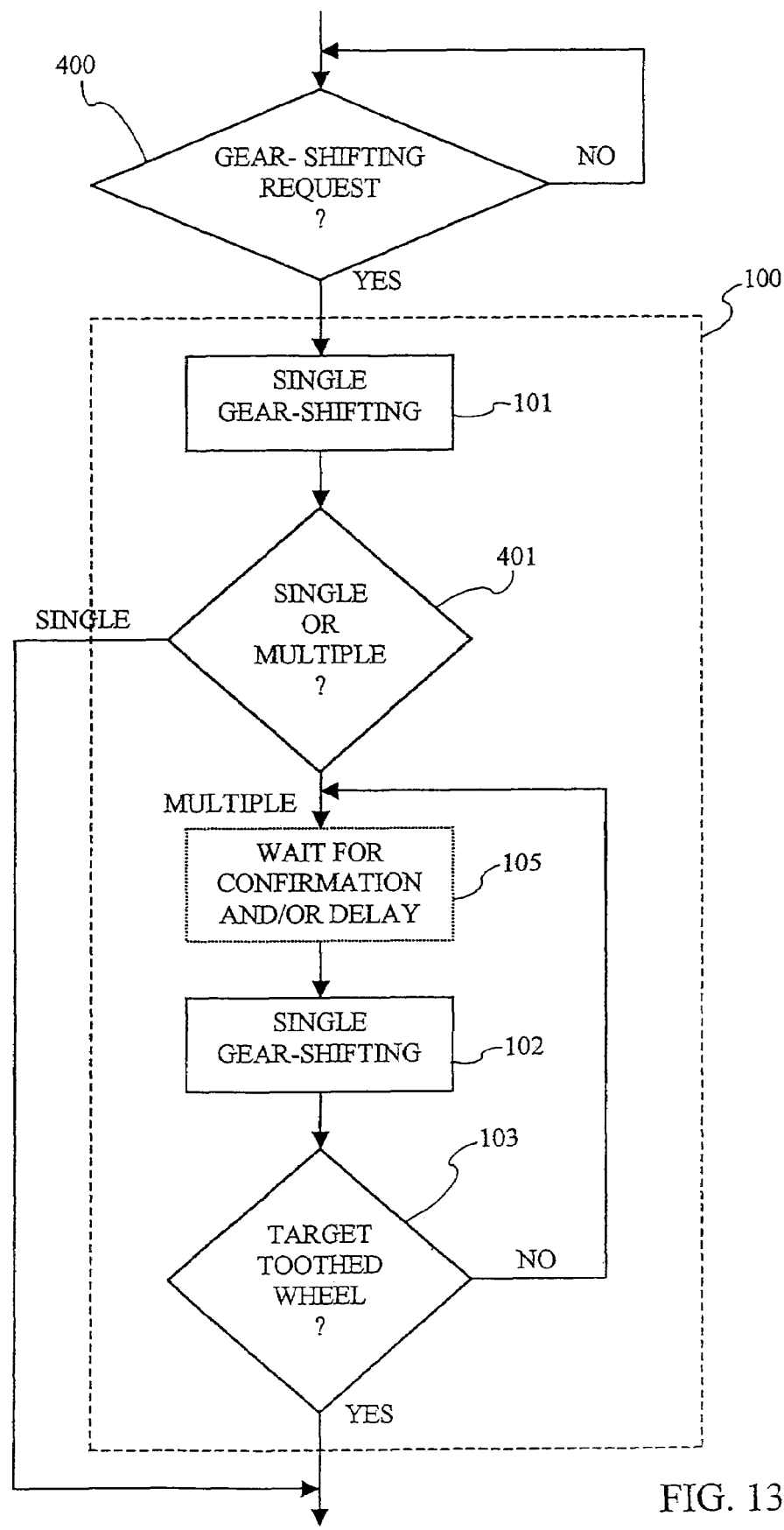

In other words, with reference to the block diagram of FIG. 13, upon receipt of a gear-shifting request in block 400, block 101 (cf. FIG. 6) of actuating a single gear-shifting is immediately carried out to move the chain 13 to a toothed wheel immediately adjacent to the current toothed wheel; immediately after or during its execution, it is established in block 401 whether the request is for a multiple or a simple gear-shifting. In the first case, the execution shall continue as described above with reference to FIG. 6, whereas in the second case the execution shall end.

Another embodiment (FIG. 14) comprises the steps of waiting 403 for the receipt of a start of gear-shifting request, carrying out block 101 (cf. FIG. 6) of actuating a single gear-shifting to move the chain 13 to a toothed wheel immediately adjacent to the current toothed wheel, and at the same time monitoring, in a parallel cycle represented by block 404, the receipt of an end of gear-shifting request. If the end of gear-shifting request is received—as represented by the generation of the lightning symbol 405—before starting the first execution of step 102 (cf. FIG. 6), the operation goes back to block 403, as represented by the path forced by the lightning symbol 405a. Otherwise, the cycle represented by blocks 102, 103 and possibly 105 is repeated, wherein the repetition takes place until receipt of an end of gear-shifting request as an indication of the condition that the immediately adjacent toothed wheel is the target toothed wheel. This is schematically indicated by the lightning symbol 405b which forces the "yes" output from block 103.

This embodiment is particularly advantageous since it allows the electronic control unit or the user, in automatic or semiautomatic operation and in manual operation respectively, to establish, after the fact, when a satisfactory transmission ratio has been reached. In the case of manual operation, the start request and the end request can be respectively provided by the actuation and release of a button or lever (for example one of the levers 43-46), by the pressing of two different buttons, or by a first actuation and a subsequent second actuation of a button or lever (for example one of the levers 43-46).

In the various embodiments outlined above, a gear-shifting request, either multiple or simple, can be suspended until a predetermined minimum time has passed from the actuation of the last previous gear-shifting, either multiple or simple, due to the technical reasons outlined above.

Figure 12:
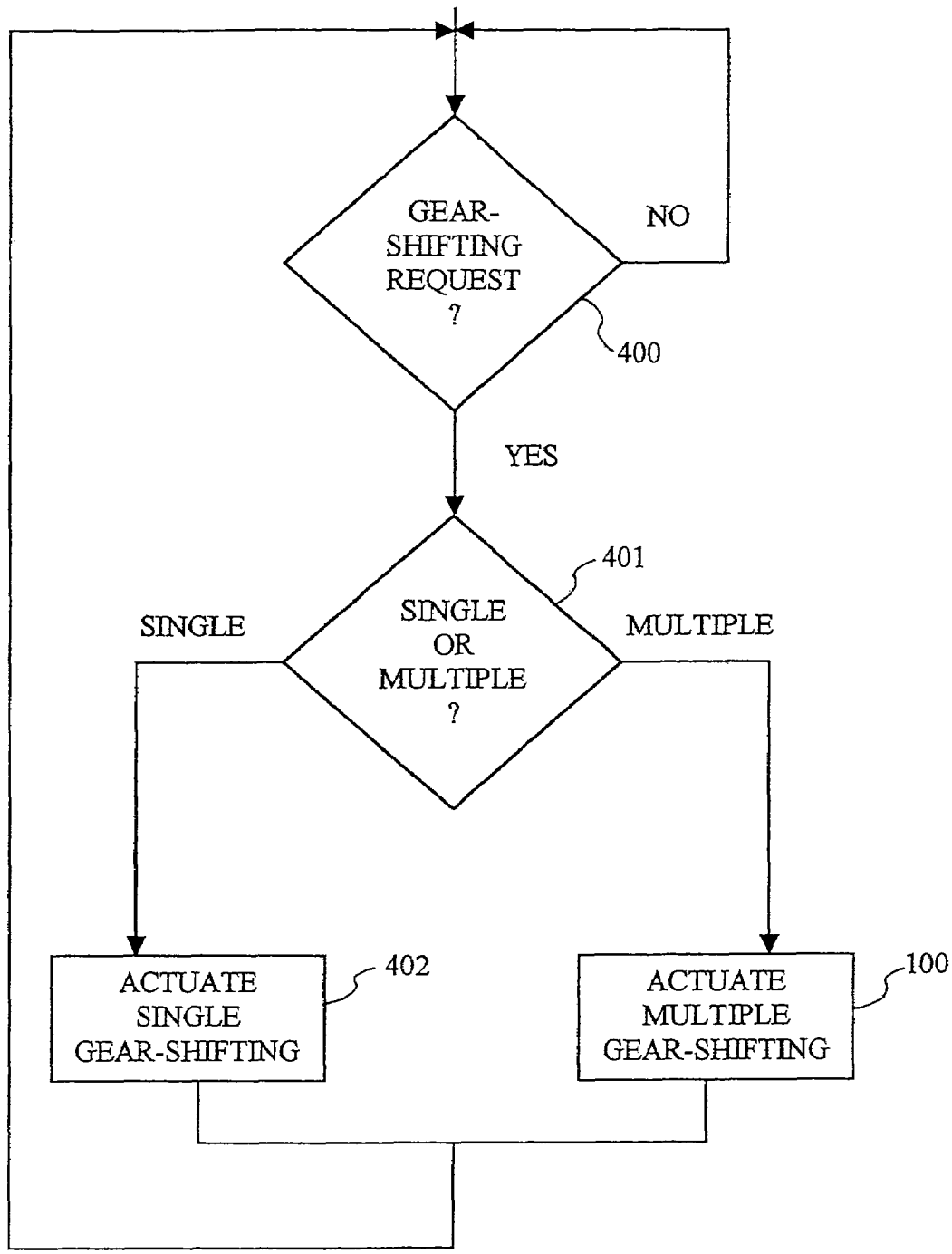
FIGS. 12-14 are block diagrams of the management of single and multiple gear-shiftings.
Figure 14:
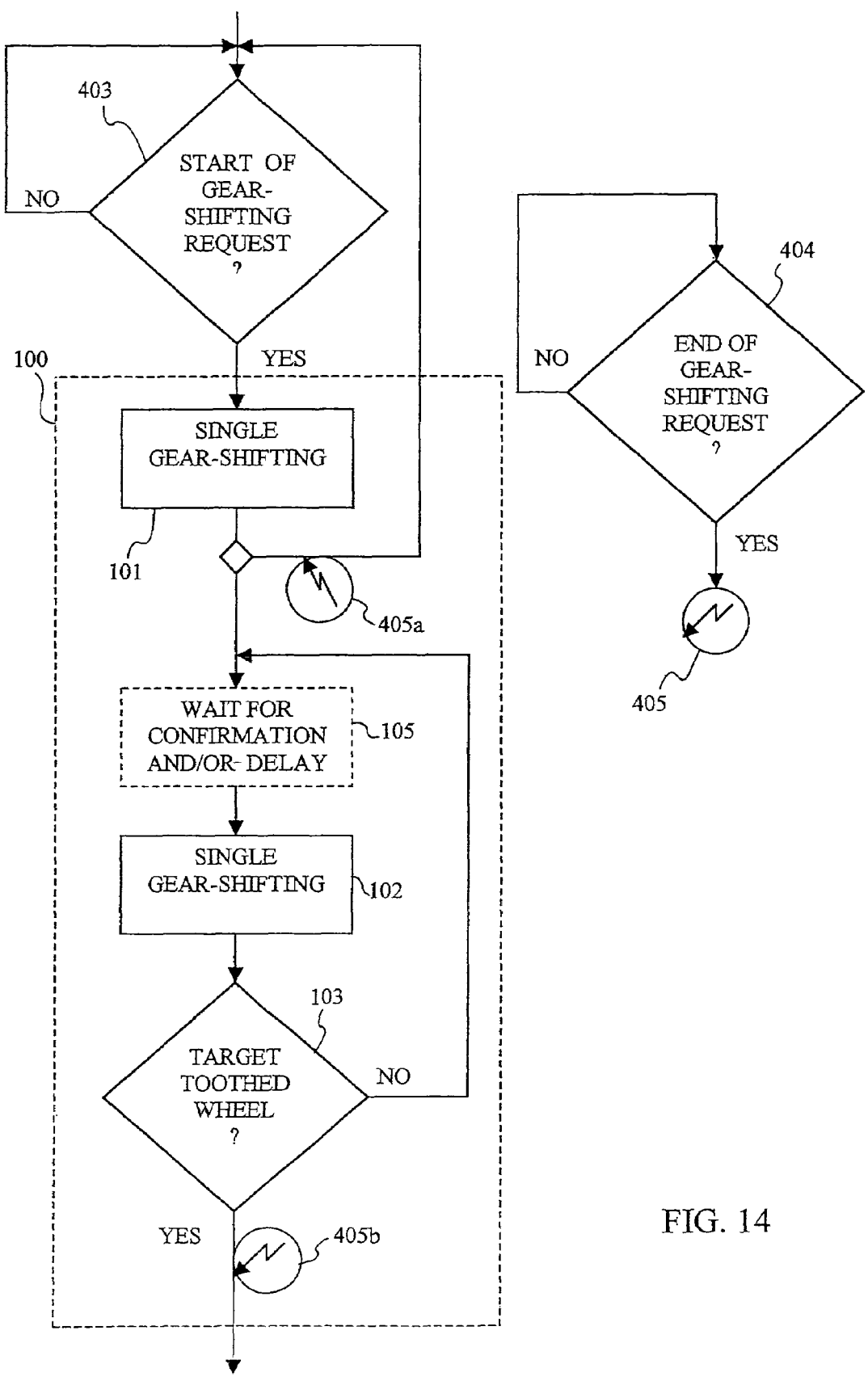

In other words, blocks 101 of FIG. 6, 400 of FIG. 12, 400 of FIG. 13 and 403 of FIG. 14 can be preceded by a block of waiting for a delay, not shown.

Both this wait for a delay and the wait for the delay during the actuation of the multiple gear-shifting (block 105) can in practice be embodied by a cycle in the software program according to the invention, or else through a timer.

The timer can, of course, be a count-down or a count-up timer and can be embodied by a memory variable managed by the clock signal of a microprocessor of the electronic control unit 40 or by a dedicated device.

Besides being able to have a preset value, the delay can be dynamically calculated, in other words it can be predetermined as a function of a predetermined desired displacement of the chain 13 on the intermediate toothed wheel.

The displacement can be evaluated based upon an angular position or angular speed sensor (not shown) of one or both gearshift groups 9, 10 with respect to an angular reference position. It should be noted that the angular speeds of the two gearshift groups are related to each other by the current transmission ratio, given by the ratio between the radii of the toothed wheels 11, 12 respectively engaged with the chain 13. Therefore, a single sensor in one of the two gearshift groups is sufficient. As a further alternative, an angular position or angular speed sensor coupled with one of the two wheels 4, 6 of the bicycle 1 can be used.

Preferably the sensor detects the crossing of a reference position by at least one chain engagement facilitating portion of the intermediate toothed wheel, for example as described in U.S. Pat. No. 6,634,971, and incorporated by reference as if fully set forth.

The predetermined displacement can be also evaluated based upon the speed of the chain or of the bicycle, detected by a suitable sensor.

Advantageously, the predetermined angular displacement is chosen as equal to the angular distance between chain engagement facilitating portions of the intermediate toothed wheel or to a whole multiple of such an angular distance.

In particular, if there are m facilitating portions equally distributed on the toothed wheel at an angular distance ALFA, the desired displacement shall preferably be chosen as equal to n×ALFA (with n integer greater than or equal to 1) and the delay can be calculated from the relationship D=R×n×ALFA/v or D=n×ALFA/w, where R is the radius of the intermediate toothed wheel, v and w are the speed of the chain, respectively linear and angular, at the intermediate toothed wheel.

The microprocessor(s) electronic control unit with 40 can, for example, be made in C-MOS technology, which has the advantages of having low energy consumption.

As an alternative to implementation through dedicated hardware, the functionalities of the electronic control unit 40 described above can be accomplished by a software program that can be loaded in a small computer.

What is claimed is:

1. A method for electronically servo-assisting an electronically servo-assisted bicycle gearshift, comprising the step of:
   a) actuating a multiple gear-shifting to move a chain in a gear-shifting direction with respect to a gearshift group having at least three toothed wheels, from a current toothed wheel to a target toothed wheel not immediately adjacent to the current toothed wheel
   wherein step a) includes the steps of:
   b) actuating a single gear-shifting to move the chain to a toothed wheel immediately adjacent to the current toothed wheel in the gear-shifting direction,
   c) repeating step b) until said immediately adjacent toothed wheel is the target toothed wheel.

2. The method of claim 1 wherein said step c) comprises the step of:
   d) waiting for a confirmation of the previous execution of step b).

3. The method of claim 1 wherein said step c) comprises the step of:
   e) waiting for a predetermined delay.

4. The method of claim 2 wherein said step c) comprises the step of e) waiting for a predetermined delay within the range between 100 milliseconds and 350 milliseconds.

5. The method of claim 2 wherein said step c) comprises the step of e) waiting for a predetermined delay, and wherein the predetermined delay is increased or decreased, respectively, dependent on whether the confirmation is received before or after a foreseen instant of successful actuation of the single gear-shifting.

6. The method of claim 3, wherein said predetermined delay is independently provided or not, for each gearshift group.

7. The method of claim 3 wherein said predetermined delay is independently provided or not, for each gear-shifting direction.

8. The method of claim 3 wherein said predetermined delay is independently provided or not, for each immediately adjacent toothed wheel.

9. The method of claim 3 wherein the delay is manually set using a user interface.

10. The method of claim 3 further comprising the step of:
    f) setting the predetermined delay as a function of a predetermined displacement of the chain on said immediately adjacent toothed wheel.

11. The method of claim 10 wherein the predetermined displacement is evaluated based upon an angular position sensor or an angular speed sensor.

12. The method of claim 11 wherein the angular position sensor comprises a sensor that detects the crossing of an angular reference position by at least one chain engagement facilitating portion of the immediately adjacent toothed wheel.

13. The method of claim 10 wherein the predetermined displacement is evaluated based upon respectively the speed of the chain or of the bicycle.

14. The method of claim 10 wherein the predetermined displacement is equal to the angular distance between chain engagement facilitating portions of the immediately adjacent toothed wheel or to a whole multiple thereof.

15. The method of claim 1 further comprising the steps of:
i) waiting for a gear-shifting request,
j) establishing whether the gear-shifting request is a single gear-shifting request or a multiple gear-shifting request, wherein this step is carried out at the same time as step b),
wherein if the gear-shifting request is a multiple gear-shifting request, executing said step c),
wherein if the gear-shifting request is a single gear-shifting request, executing step i).

16. The method of claim 15 wherein said requests are received by a user interface.

17. The method of claim 15 comprising the step of suspending the gear-shifting request until a predetermined minimum time from the actuation of the last previous gear-shifting has passed.

18. The method of claim 1 further comprising the steps carried out before step b), of:
k) waiting to receive a start of gear-shifting request, and
b1) monitoring the receipt of an end of gear-shifting request,
wherein if the end of gear-shifting request is received before starting the execution of step c), executing step k), or alternately
executing said step c), and repeating said step b) until receipt of the end of gear-shifting request as an indication of the condition that the immediately adjacent toothed wheel is the target toothed wheel.

19. The method of claim 18 wherein said requests are received by a user interface.

20. The method of claim 18 comprising the step of suspending the gear-shifting request until a predetermined minimum time from the actuation of the last previous gear-shifting has passed.

21. A method for electronically servo-assisting an electronically servo-assisted bicycle gearshift, comprising the steps of:
a) waiting to receive a gear-shifting request,
b) establishing whether the gear-shifting request is a single gear-shifting request or a multiple gear-shifting request,
h1) wherein if the gear-shifting request is a single gear-shifting request, a bicycle chain is moved from a starting toothed wheel to a target toothed wheel immediately adjacent to the starting toothed wheel in the gear-shifting direction,
h2) if it is a multiple gear-shifting request, the chain is moved from a current toothed wheel to a target toothed wheel not immediately adjacent to the current toothed wheel, wherein a step gear-shifting moves the chain to a toothed wheel immediately adjacent to the current toothed wheel in the gear-shifting direction, and this step gear-shifting occurs until said immediately adjacent toothed wheel is the target toothed wheel.

22. The method of claim 21 wherein the step b) is carried out based upon the duration of a signal received by a user interface.

23. The method of claim 21 wherein the step b) is carried out based upon the number of consecutive signals received by a user interface.

24. The method of claim 21 wherein step b) is carried out based upon a signal received by a user interface chosen among a plurality of signals.

25. The method of claim 21 wherein said requests are received by a user interface.

26. The method of claim 21, further comprising the step of suspending the gear-shifting request until a predetermined minimum time from the actuation of the last previous gear-shifting has passed.

27. A program for electronically servo-assisting a bicycle gearshift comprising program code means suitable to carry out shifting multiple gears, wherein the program is carried out on a processor, embodied in at least one micro-controller, the program carrying out the step comprising:
a) actuating a multiple gear-shifting to move a chain in a gear-shifting direction with respect to a gearshift group having at least three toothed wheels, from a current toothed wheel to a target toothed wheel not immediately adjacent to the current toothed wheel;
wherein step a) of actuating a multiple gear-shifting comprises the steps of:
b) actuating a single gear-shifting to move the chain to a toothed wheel immediately adjacent to the current toothed wheel in the gear-shifting direction;
c) repeating step b) until said immediately adjacent toothed wheel is the target toothed wheel.

28. An electronic circuit suitable to carry out a method for electronically servo-assisting an electronically servo-assisted bicycle gearshift, comprising the step of:
a) actuating a multiple gear-shifting to move a chain in a gear-shifting direction with respect to a gearshift group having at least three toothed wheels, from a current toothed wheel to a target toothed wheel not immediately adjacent to the current toothed wheel;
wherein step a) of actuating a multiple gear-shifting comprises the steps of:
b) actuating a single gear-shifting to move the chain to a toothed wheel immediately adjacent to the current toothed wheel in the gear-shifting direction;
c) repeating step b) until said immediately adjacent toothed wheel is the target toothed wheel.

29. An electronically servo-assisted bicycle gearshift, comprising:
a chain and toothed wheels system for the transmission of motion from the axle of the pedal cranks to a driving-wheel of the bicycle, said motion transmission system comprising
at least one gearshift group having at least three toothed wheels coaxial along an axis (X) selected among the axle of the pedal cranks and the axis (A) of the driving-wheel, said at least one gearshift group comprising a guide element to move the chain into engagement with a predetermined toothed wheel of the gearshift group and an actuator of the guide element,
an electronic control unit suitable to drive the actuator of the at least one gearshift group, said unit executing the steps of
a) actuating a multiple gear-shifting to move the chain in a gear-shifting direction with respect to the gearshift group, from a current toothed wheel to a target toothed wheel not immediately adjacent to the current toothed wheel
wherein step a) of actuating a multiple gear-shifting comprises the steps of:
b) actuating a single gear-shifting to move the chain to a toothed wheel immediately adjacent to the current toothed wheel in the gear-shifting direction, c) repeating step b) until said immediately adjacent toothed wheel is the target toothed wheel.

30. The bicycle gearshift of claim 29 wherein said at least one gearshift group comprises a transducer that indicates the position of the guide element with respect to the toothed wheels of the gearshift group, and provides a confirmation signal indicating the completion of step b).

31. The bicycle gearshift of claim 29 wherein the electronic control unit comprises memory means suitable to store a predetermined delay that takes place during step c).

32. The bicycle gearshift of claim 31 further comprising an interface between a user and the electronic control unit, operating to send a gear-shifting request, start of gear-shifting request and/or end of gear-shifting request signals to the electronic control unit, and/or to set the value of the predetermined delay.

33. The bicycle gearshift of claim 31 wherein the memory means are housed in a casing that can be removed from the bicycle, preferably in a removable display unit.

34. An electronic bicycle gearshift for shifting multiple gears comprising:
    a processor that controls an actuator that controls the movement of a chain guide element;
    a chain that engages one of at least three adjacent toothed wheels on a bicycle and is movable by the chain guide element;
    wherein when the processor receives a signal to shift between a current toothed wheel that the chain engages to a non-adjacent target toothed wheel, the processor directs the chain guide element to move the chain so that it engages each toothed wheel between the current toothed wheel and the target toothed wheel until the chain engages the target toothed wheel.

35. An electronic bicycle gearshift for shifting multiple gears comprising:
    a chain that engages one of at least three adjacent toothed wheels on a bicycle and is movable by a chain guide element;
    a processor that controls an actuator that controls the movement of the chain guide element, the processor storing logic values that represent the physical locations of toothed wheels, and at least one logic value that represents the physical location of the actuator;
    wherein when the processor receives a signal to shift between a current toothed wheel that the chain engages to a non-adjacent target toothed wheel, the processor directs the chain guide element to move the chain so that it engages each toothed wheel between the current toothed wheel and the target toothed wheel until the chain engages the target toothed wheel.

36. The gearshift of claim 35 wherein each successive engagement of a toothed wheel is preceded by a predetermined delay.

37. The gearshift of claim 36 wherein said predetermined delay is within the range between 100 milliseconds and 350 milliseconds.

38. The gearshift of claim 35 wherein the at least one logic value that represents the position of the actuator is provided by a counter updated by the electronic control unit when the electronic control unit drives the actuator.

39. The gearshift of claim 38 wherein the actuator comprises a motor.

40. The gearshift of claim 39 wherein the motor is a stepper motor.

41. The gearshift of claim 40 wherein the counter increases or decreases with every step actuation of the stepper motor.

* * * * *